United States Patent [19]

Patten et al.

[11] Patent Number: 4,500,602
[45] Date of Patent: Feb. 19, 1985

[54] COMPOSITE PROTECTIVE COATING FOR CARBON-CARBON SUBSTRATES

[75] Inventors: James W. Patten; Ronald W. Moss, both of Richland, Wash.; Brennan A. Forcht, Arlington, Tex.

[73] Assignee: LTV Aerospace and Defense Co., Dallas, Tex.

[21] Appl. No.: 291,729

[22] Filed: Aug. 10, 1981

[51] Int. Cl.$^3$ .................................................. B32B 9/00
[52] U.S. Cl. .................................. 428/408; 428/366; 428/367; 428/384; 428/698
[58] Field of Search ............ 428/366, 367, 375, 698, 428/688, 408, 411, 379, 384; 427/38, 376.2, 383 R, 383 A, 419.1, 419.2, 419.7

[56] References Cited

U.S. PATENT DOCUMENTS

| | | | |
|---|---|---|---|
| 3,006,782 | 10/1961 | Wheildon, Jr. | 427/419.2 |
| 3,073,717 | 1/1963 | Pyle et al. | 428/698 X |
| 3,120,453 | 2/1964 | Fitzer et al. | 428/698 X |
| 3,476,586 | 11/1969 | Vaitcher et al. | 427/419.2 |
| 3,939,028 | 2/1976 | Schiffarth | 428/698 |
| 4,002,784 | 1/1977 | Banker et al. | 427/419.2 |
| 4,275,095 | 6/1981 | Warren | 427/419.7 |

FOREIGN PATENT DOCUMENTS

| | | | |
|---|---|---|---|
| 2842393 | 6/1979 | Fed. Rep. of Germany | 427/38 |
| 55-110127 | 8/1980 | Japan | 427/38 |

*Primary Examiner*—Lorraine T. Kendell
*Attorney, Agent, or Firm*—Stephen S. Sadacca; James M. Cate

[57] ABSTRACT

Composite protective coatings for protecting carbonaceous substrates from degrading in oxygen containing environments are provided. The composite protective coatings include a first coating layer applied to the surface of the substrate. The first coating layer is a silicon carbide type coating. The second coating layer is applied to the surface of a first coating layer and is a sputter deposited phase stabilized zirconium oxide having a columnar microstructure. Carbonaceous substrates having the composite protective coatings are able to withstand temperatures of about 4100° F. in oxygen containing environments.

12 Claims, No Drawings

COMPOSITE PROTECTIVE COATING FOR CARBON-CARBON SUBSTRATES

TECHNICAL FIELD

This invention relates to protecting carbon and graphite materials from degradation at elevated temperatures. More particularly, the invention relates to the protection of reinforced carbon-carbon composite substrate materials, utilizing a composite protective coating that includes a first layer of a silicon carbide type coating and a second layer comprising a cathode sputtered stabilized zirconium oxide layer having a columnar microstructure.

BACKGROUND ART

Graphite and carbon materials, especially reinforced carbon-carbon composite substrate materials, are subject to many applications in modern industry, particularly in the aerospace and aviation fields. However, such materials, when unprotected, are subject to degradation at elevated temperatures. Since many applications involve high temperatures, resistance to high temperature and thermal shock are often required properties of the material.

Reinforced carbon-carbon composite substrates are generally constructed of fibers and bound by carbon matrix, resulting in a material having excellent structural properties. Generally, precursors for carbonaceous fibers such as polyacrylonitrile, rayon or pitch-based fibers are utilized. Carbon-carbon impregnation materials generally are phenolic, furfuryl or pitch-based materials. However, the use of a specific impregnation or substrate material is not a limitation upon the present invention.

Graphite and carbon materials, including reinforced carbon-carbon composites, are subject to degradation, such as oxidation, when utilized in high temperature environments in the presence of oxygen. Generally, an unprotected graphite or carbon material will begin to oxidize at temperatures in excess of about 650° F. in air. Therefore, in order to effectively utilize these materials in high temperature applications, it is necessary to provide protection from degradation, including oxidation. Accordingly, a need exists for a protective coating suitable for use on graphite and carbon materials, and especially for reinforced carbon-carbon composite materials, where such materials are subject to temperatures ranging from about 650° F. to about about 4100° F.

Various types of sputtering techniques are known to those skilled in the art. For example, sputtered oxide coatings for airfoil applications and sputter deposited multilayered ceramic-metal coatings are described respectively in a paper entitled "Improvement of Sputtered Oxide Coating Adherence and Integrity for Turbine Airfoil Applications" by M. A. Bayne, R. Busch, J. W. Fairbanks and J. W. Patten and in a paper entitled "Development of Sputter Deposited Multilayered Ceramic/Metal Coatings" by J. W. Patten, R. W. Moss, M. A. Bayne, D. D. Hays and E. D. McClanahan, both papers presented in the "Proceedings of the First Conference on Advanced Materials for Alternative Fuel Capable Directly Fired Heat Engines" in Castein, Maine on July 31-Aug. 3, 1979, and published by the U.S. Department of Energy, December 1979, CONF-790749. These references are hereby incorporated by reference and relate to the use of certain sputtered coatings on metallic substrates.

DISCLOSURE OF THE INVENTION

In accordance with the present invention, a composite coating is provided for protecting carbonaceous substrate materials from degradation at temperatures of up to about 4100° F. in oxygen containing environments.

Broadly stated, a composite protective coating for preventing carbonaceous substrates from degrading in oxygen containing environments is provided and comprises a first coating layer applied to the surface of the substrate that is a silicon carbide type coating. Generally, this first coating is formed from a mixture of silicon, silicon carbide and alumina or a mixture of silicon, silicon carbide and boron. The composite coating further comprises a second coating layer applied to the surface of the first coating layer which is a sputter deposited phase stabilized zirconium oxide having a columnar microstructure.

Generally, the silicon type coating layer is formed by packing the substrate in a composition containing specified amounts of silicon, silicon carbide and alumina or silicon, silicon carbide and boron. This combination is then subjected to heat for a period sufficient to form the first coating layer. After formation of the first coating layer, an enhancement coating may be applied thereto, which becomes part of the first coating layer.

After the formation of the first coating layer including the enhancement coating portion, if any, the exposed surface is ion bombardment etched to remove surface oxides and adsorbed gases, for example, to provide an atomically clean surface.

The second coating layer is then applied to the atomically clean surface of the first coating layer. The second coating layer comprises a sputter deposited phase stabilized zirconium oxide having a columnar microstructure.

DETAILED DESCRIPTION

In accordance with one aspect of the present invention, composite coatings are provided for protecting carbon-carbon substrates from degradation at elevated temperatures in oxygen containing environments. While the present invention is primarily concerned with protecting reinforced carbon-carbon composite substrates, the invention is also applicable to the formation of coatings on various types of graphite and carbon substrates. The term "carbonaceous substrate" for purposes of this invention includes all such materials.

The composite coatings are useful for protecting a substrate from degradation at sustained temperatures of up to about 4100° F. in oxygen containing environments.

The composite coatings in accordance with the invention generally comprise a first coating layer applied to the surface of a carbonaceous substrate which is a silicon carbide type coating. The second coating is applied to the surface of the first coating, which is a sputter deposited phase stabilized zirconium oxide having a columnar microstructure. A columnar microstructure is obtained by varying the arrival angle of the adatom flux with respect to time and providing an adatom flux that arrives at the surface of the substrate in a fairly columnated fashion, or by providing a disperse adatom flux at the substrate surface, the objective of either technique being to promote growth of defects by geometrical shadowing of some portion of the adatom flux by surface asperities.

Generally, the silicon carbide type coating is formed from several different types of particulate compositions. These compositions contain either particulate silicon, silicon carbide and alumina or particulate silicon, silicon carbide and boron. As hereinafter described in detail, the silicon carbide type coating layer is formed by packing the substrate in the particulate composition and thereafter heating the composition and substrate in a manner to form the first coating layer. Formation of the first coating layer will be described now in greater detail.

Broadly stated, one type of composition for forming the first coating layer on carbonaceous substrate materials comprises between about 25% and 40% particulate silicon by weight of the total composition, between about 50% and 70% particulate silicon carbide by weight of the total composition and between about 1% and 15% of particulate boron by weight of the total composition. The composition should also include a minor amount of magnesium oxide. Magnesium oxide is generally present as an impurity in technical grade particulate boron in sufficient quantity.

The method for forming the first coating layer from a silicon carbide, silicon and boron mixture comprises forming an essentially uniform mixture of particulate silicon, silicon carbide and boron from the aforesaid composition range, together with a minor amount of magnesium oxide. The substrate that is to be coated is encased in a release agent that is a carbonaceous material, such as filter paper, that is preferably free of metallic impurities. The encased substrate is contacted with the aforesaid mixture. Thereafter, the encased substrate and mixture is heated and maintained between about 3175° F. and 3350° F. in an inert atmosphere for a period of time sufficient to form a coating of the desired thickness on the surface of the substrate from the mixture. The encased substrate is maintained in contact with the mixture during heating. Generally, the encased substrate and mixture will be heated for a period of between about 4 and 7 hours to form the primary coating that is usually between about $1.3 \times 10^2$ and $7.6 \times 10^3$ micrometers thick. The thickness of the primary coating obtained depends on several factors, including the time-temperature profile (TTP), the concentration of components and the type of substrate material.

In a preferred embodiment, the silicon-silicon carbide-boron composition comprises about 35% by weight silicon, about 60% by weight silicon carbide and about 5% by weight boron. Minor amounts of magnesium oxide should also be present. Generally, technical grade boron contains magnesium oxide as an impurity in a sufficient amount for purposes of the invention. Technical grade boron generally contains between about 8–10% by weight impurities, most of which is magnesium oxide. The magnesium oxide facilitates formation of the silicon carbide-silicon-boron coating on the substrate. Generally, between about 2–8% magnesium oxide is preferred and about 4% magnesium oxide by weight of the boron is most preferred in the composition for forming this type of first coating layer. Preferably, particulate amorphous boron is utilized and one preferred type can be obtained from the Kerr McGee Company, a corporation of the state of Delaware, sold under the trade designation "Trona" which contains about 90% to 92% by weight of particulate boron with the remainder containing impurities of which magnesium oxide is the major impurity. While understanding the function of the magnesium oxide is not essential to practicing the invention, it is believed that the magnesium oxide present in the boron acts as a fluxing agent facilitating formation of the silicon carbide-silicon-boron first coating layer.

In utilizing the silicon carbide, silicon and boron composition, the components are mixed together to form a uniform mixture. In order to form the first coating layer, the mixture is brought into contact with a release agent that encases the substrate. The release agent is a carbonaceous material that is preferably free of metallic impurities and encloses the substrate. The release agent may be, for example, ash free paper. Preferably, the release agent is a combination of ash free filter paper and filter paper pulp that is applied with a binder material, such as hydroxypropyl methyl cellulose. A preferred type of hydroxypropyl methyl cellulose is sold by the Dow Chemical Company of Midland, Mich. under the tradename "Methocel." The use of the filter paper in combination with filter paper pulp and binder solution allows the substrate to be easily encased by the release agent. The release agent facilitates removal of the substrate from the mixture after the first coating layer has been formed. When a binder, such as hydroxypropyl methyl cellulose is utilized, the release agent is heated generally between about 200° F. and 400° F. to dry and cure the binder. After the release agent encloses substrate, the mixture is brought into contact with the encased substrate. Generally, the entire substrate or part will be encased by the mixture resulting in a first layer coating on the entire surface of the substrate.

Preferably, the encased substrate to be coated having the release agent thereon is placed in a graphite retort or other container that is capable of withstanding very high temperatures. The mixture is uniformly packed around the substrate so that the mixture completely encases the substrate. Most preferably, the compaction of the mixtures is tested for surface compaction. It is preferred that the surface compaction unconfined strength is between about 5.0 and 6.0 tons/ft$^2$ (between about $5.317 \times 10^3$ and $6.380 \times 10^3$ kg/m$^2$), which can be measured on a soil tester sold by Soil Test Inc. of Chicago, Ill., Model No. CL 700, which is used with a probe of circular cross-section, one-half inch (1.27 centimeters) in diameter and is inserted to a depth of one-quarter inch (0.635 centimeters) into mixture.

As an alternative to packing the mixture for completely encasing the substrate with the mixture, a slurry of the composition and a carrier liquid can be utilized in which the slurry encases the substrate having the release agent thereon. Suitable carrier liquids include water, isopropyl alcohol and mixtures thereof, for example.

In packing the substrate in the composition it is advantageous to provide parting planes for facilitating removal of the substrate after the coating is formed from the silicon carbide, silicon and boron composition, since this type of composition tends to solidify into a hard mass after heating. Parting planes can be provided by dividing the volume of composition into separate quandrants, utilizing a carbonaceous material such as paper, preferably ash free filter paper.

Generally, a weight is placed upon the unconfined surface of the mixture to help maintain contact between the mixture and the encased substrate, since the carbonaceous material that encases the substrate degrades upon heating.

After the silicon carbide, silicon and boron composition encases the substrate and release agent, the composition is dried under vacuum. Thereafter, the graphite retort containing the mixture and substrate is placed in an inert atmosphere. Preferably, an argon gas atmosphere is utilized, at a pressure of about 3 psi (gauge). The graphite retort and its contents are then heated to form the coating. The furnaces used for heating to produce the protective coating generally have graphite resistance tubes as heating elements or use graphite receptors which are heated by induction. The retorts are then heated by radiation.

Generally, the retort and its contents are heated in the range of between about 3175° F. and 3350° F. for a period of time sufficient to form the protective coating of a desired thickness from the silicon carbide, silicon and boron mixture. It is generally preferred to first heat the retort and its contents to about 2800° F. to facilitate attainment of a desired temperature. Thereafter, the retort and its contents are maintained at a temperature of about 3100° F. for about 2 hours. Then, the retort and its contents are heated so that a temperature of about 3300° F. is maintained for 2 hours. The retort and its contents are then cooled. Generally, cooling is accomplished by turning off power to the furnace. The foregoing described step-heating process is preferred because a more uniform coating results than if the retort and its contents were maintained at a fixed temperature. Generally, the 4 hour step-heating process as previously described produces a first layer coating from the silicon carbide, silicon and boron mixture that is between about $1.3 \times 10^2$ and $2.5 \times 10^2$ micrometers thick.

Another preferred composition for forming the first coating layer is a silicon carbide, silicon and alumina mixture. Broadly stated, this composition comprises between about 30% and 75% particulate silicon by weight of the total composition, between about 0% and 59% particulate silicon carbide by weight of the total composition and between about 11% and 60% particulate alumina by weight of the total composition. The preferred silicon carbide, silicon and alumina composition contains between about 40% and 50% by weight silicon, between about 30% and 50% by weight silicon carbide and between about 20% and 30% by weight alumina. The most preferred silicon carbide, silicon and alumina composition contains about 30% by weight silicon carbide, about 50% by weight silicon and about 20% by weight alumina. Generally, when silicon carbide, silicon and alumina compositions are utilized having a lower concentration of silicon carbide than the preferred range, a supplementary composition is also utilized and applied directly to the substrate as a slurry, as hereinafter described. The supplementary composition contains a relatively high concentration of silicon carbide and facilitates removal of the substrate from the composition components after the first coating layer is formed.

The first coating layer is formed on the substrate from a silicon carbide, silicon and alumina mixture by forming an essentially uniform mixture of particulate silicon, silicon carbide and alumina in the range of the aforesaid preferred compositions and thereafter contacting the substrate with the mixture. Thereafter, the silicon carbide, silicon and alumina mixture and the substrate is heated and maintained between about 2950° F. and 3100° F. in an inert atmosphere for a period of time sufficient to form a coating of the desired thickness on the surface of the substrate from the mixture. Generally, the substrate and mixture will be heated for a period of between about 4 and 7 hours to form a first coating layer that is usually between about $1.3 \times 10^2$ and $1.3 \times 10^3$ micrometers thick. The thickness of the first coating layer obtained depends on several factors, including the time-temperature profile (TTP), the concentration of components and the type of substrate material.

Generally, when silicon carbide, silicon and alumina compositions are utilized having a lower concentration of silicon carbide than the preferred range, a supplementary composition is also utilized and applied directly to the substrate as a slurry, as hereinafter described. The supplementary composition contains a relatively high concentration of silicon carbide and facilitates removal of the substrate from the composition components after the protective coating is formed. Generally, the supplementary composition contains between about 30% and 40% by weight silicon, between about 30% and 40% by weight silicon carbide and between about 10% and 35% be weight alumina.

The preferred particle sizes for the silicon carbide, silicon and alumina and silicon carbide, silicon and boron compositions are as follows: silicon carbide—between about 4.5 and 20.5 micrometers, silicon—about 325 Tyler standard screen scale; boron—between about 0.5 and 20 micrometers; and alumina—about 325 Tyler standard screen scale. The most preferred type of silicon carbide is sold under the trade designation "RA 1200, Class 1-green grit" by the Carborundum Company, a Delaware corporation. The most preferred type of alumina is sold by the Aluminum Co. of America of Pittsburgh, Pa. under the trade designation "T-61."

In utilizing the silicon carbide, silicon and alumina composition, the components are mixed together to form a uniform mixture. In order to form the first layer coating, the mixture is brought into contact with the substrate that is to be coated. Generally, the entire substrate or part will be encased by the mixture to form a first layer coating on the entire surface of the substrate. The substrate to be coated is placed in a graphite retort or other container that is capable of withstanding very high temperatures. The mixture is uniformly packed around the substrate so that the mixture completely encases the substrate. Preferably, the compaction of the mixture is tested for surface compaction. It is preferred that the surface compaction unconfined strength be between about 5.0 and 6.0 tons/ft$^2$ which can be measured on a soil tester sold by Soil Test Inc. of Chicago, Ill., Model No. CL 700, which has a probe of circular cross-section, one-half inch in diameter and is inserted to a depth of one-quarter inch into the mixture.

As previously described with respect to the silicon carbide-silicon-boron mixture, as an alternative to packing the silicon carbide-silicon-alumina mixture to completely encase the carbon-carbon substrate, a slurry of the composition and a carrier liquid can be utilized in which the slurry encases the carbon-carbon substrate. Suitable carrier liquids include water, isopropyl alcohol and mixtures thereof, for example.

After the silicon carbide, silicon and alumina composition encases the substrate to be coated, the composition is dried under vacuum. Thereafter, the graphite retort is placed in an inert atmosphere. Preferably an argon gas atmosphere is utilized at a pressure of about 3 psi (gauge). The graphite retort and its contents are then heated to form the coating.

Generally, for silicon carbide, silicon and alumina compositions, the retort and its contents are heated in the range of between about 2950° F. and 3100° F. for a period of time sufficient to form the protective coating of a desired thickness. It is generally preferred to first heat the retort and its contents to about 2800° F. so that a uniform elevated temperature can be more easily attained. After the initial heating, most preferably the retort and its contents are maintained at a temperature of about 2950° F. for about 2 hours. Then the retort and its contents are maintained at a temperature of about 3000° F. for 2 more hours. Finally, the retort and its contents are maintained at a temperature of about 3050° F., again for 2 hours. The retort and its contents are then cooled. Generally, cooling is accomplished by turning off the power to the furnace. The foregoing described step-heating process is preferred because a more uniform coating results than if the retort and its contents were heated to a fixed temperature. Generally, the 6 hour step-heating process as previously described produces a first layer coating from the silicon carbide, silicon and alumina mixture that is about $1.3 \times 10^2$ and $1.3 \times 10^3$ micrometers thick.

Usually, suitable first layer coatings can be formed utilizing the above-described method when the preferred silicon carbide, silicon and alumina composition range is used, that is, between about 30% and 50% by weight silicon carbide, between about 40% and 50% by weight silicon and between about 20% and 30% by weight alumina. Generally, when the composition contains a lower amount of silicon carbide, a supplementary composition should be utilized and is applied as a slurry to the substrate prior to packing the part with the composition. The slurry can be applied using a suitable carrier material. Suitable carrier materials include isopropyl alcohol, methyl cellulose-water solutions and silicate-base materials, for example. One purpose of the supplementary mixture is to insure that the substrate will be more easily removable from mixture that encases the substrate after the coating is applied, since silicon carbide, silicon and alumina compositions outside of the preferred range often become a hardened mass after heating. Preferably, the slurry is applied to a thickness of between about $1.3 \times 10^2$ and $5.1 \times 10^3$ micrometers.

Optionally, an enhancement coating can be applied to the surface of the first layer coating. The enhancement coating has the effect of sealing the substrate surface from the surrounding environment should there be any imperfections in the first coating layer and is considered to be part of the first coating layer for purposes of the invention.

For the first coating layer formed from either the silicon carbide, silicon and alumina or silicon carbide, silicon and boron compositions, the enhancement coating can be formed by first impregnating the first coating layer with tetraethyl orthosilicate. The tetraethyl orthosilicate is then heat cured forming a silica coating on the primary coating.

Preferably, the tetraethyl orthosilicate is applied about five times to the first coating layer before final curing to insure that a sufficient amount of tetraethyl orthosilicate has impregnated the first coating layer. Generally, the heat curing takes place at between about 225° F. and 275° F. after each impregnation for between about 45 and 60 minutes after the tetraethyl orthosilicate solidifies, forming crystals. After the fifth impregnation the part is preferably heated for about 2 hours after crystallization of the tetraethyl orthosilicate. The part is then cooled and reheated to between about 375° F. and 425° F. for between about 2 and 2.5 hours. Finally, the part is heated and maintained at between about 565° F. and 625° F. for between about 6 and 7 hours.

Thereafter, a mixture of a liquid alkali silicate and silicon carbide powder is applied to the surface and is then heat cured. Preferably, the weight ratio of the alkali silicate to silicon carbide is about 1:1. Alternatively, a mixture of water, sodium borate and sodium silicate can be substituted for the liquid alkali silicate. Preferably, per 100 ml of water, the mixture inlcudes 10 gm of sodium borate and 100 ml of a sodium silicate solution containing 39% solids sold by Ridlen's Mfg. Co. of Dallas, Tex. Generally, heating in the range of between about 200° F. and 600° F. is used to provide curing.

The preferred type of alkali silicate utilized for the slurry of alkali silicate and silicon carbide is sold under the tradename "Sermabond 487" by the Sermetal Company of Limerick, Pa. The preferred type of silicon carbide is sold under the trade designation "RA 1200-black grit" by the Carborundum Company. Preferably the powder mixture contains equal parts of the silicon carbide powder graphite felt that has been converted to powdered silicon carbide felt. Preferably, the graphite felt utilized is "grade WDF" from the Union Carbide Company, Carbide Products Division of New York, N.Y. The graphite felt can be converted to silicon carbide felt by packing the felt in a mixture containing about 30% and 60% by weight silicon carbide, between about 30% and 50% by weight silicon and between about 10% and 20% by weight alumina. The packed graphite felt is heated to between about 2950° F. and 3050° F. for about 5 to 6 hours. After the graphite felt has been converted to silicon carbide felt, the felt is powdered by any suitable method, such as a ball mill. The powdered silicon carbide converted felt should have a small random fiber size. Preferably, the fibers will have a diameter of about 8 micrometers and will be of varied length, ranging between about several micrometers and $2.5 \times 10^2$ micrometers.

The slurry is applied to the surface of the first coating layer and heat cured. The slurry can be applied to the surface using a brush, spatula or other type of suitable applicator. Preferably, the area of the part that is being coated with the slurry is kept in a wet condition as the slurry is being applied. The excess slurry is wiped off with a cheesecloth material, for example.

After the slurry is applied to the first coating layer, it is dried and heat cured. Preferably, the drying procedure is accomplished under ambient conditions for a period of about 16 hours. Thereafter, the slurry is heat cured, preferably by heating in the range of between about 185° F. and 225° F. for at least about 2 hours, thereafter heating in the range of between about 375° F. and 425° F. for at least about 2 hours and finally heating in the range of between about 575° F. and 625° F. for between about 4 and 7 hours.

For first coating layers formed from silicon carbide, silicon and boron mixtures, an alternate enhancement coating can be used and includes a monoaluminum phosphate solution containing particulate alumina and silicon carbide that is applied to the surface of the first coating layer which is thereafter heat cured. Preferably, the liquid portion of the slurry contains about 55% by weight monoaluminum phosphate and about 45% by weight distilled water. The powder components of the slurry are preferably about 31.2% particulate silicon carbide by total weight of the powder components, preferably silicon carbide sold under the trade designation "RA 1200-black grit" by the Carborundum Company, about 31.3% of particulate silicon carbide converted felt by total weight of the powder components, about 32.8% particulate alumina by weight of the powder components, sold under the trade designation "T-61", and about 4.7% by weight particulate alumina sold under the trade designation "C-333", both from the Alcoa Corporation of Pittsburgh, Pa. The liquid and particulate components are combined in a ratio that is preferably about 1:1. The slurry can be applied using either a brush, spatula or other suitable instrument. The excess slurry is wiped off from the surface, preferably with a dry cheesecloth. The slurry applied to the surface is then heat cured. Preferably, after the slurry has been applied to the primary coating, it is dried at ambient temperature for about 16 hours. Thereafter the slurry is cured by being maintained at about 200° F. for about 2 hours, then at about 400° F. for about 2 hours and finally at about 600° F. for about 4 hours. The curing is accomplished in an air oven and no special atmospheric requirements are necessary.

For some types of substrates, it may be advantageous to pretreat the substrate prior to formation of the first coating layer. In some cases, the first coating layer is formed on the substrate more uniformly when the substrate is pretreated. Three types of pretreatment have been utilized. In accordance with one type of pretreatment, the substrate is impregnated with tetraethyl orthosilicate and cured. Preferably, the tetraethyl orthosilicate is applied five times in between each application curing is accomplished by heating between about 225° F. and 275° F. for about 30 minutes after crystallization of the tetraethyl orthosilicate occurs. After the fifth impregnation, the substrate has any excess material removed therefrom and is then heat treated by heating at about 400° F. for about 2 hours and about 600° F. for 4 hours.

The second type of pretreatment is heat treatment. Generally, the substrate is heated in an inert atmosphere, preferably argon, at a temperature of about 3250° F. for about 1 hour.

The third type of pretreatment is a combination of heat treatment followed by treatment with tetraethyl orthosilicate, which can be accomplished as previously described.

After the first coating layer, including the enhancement coating if any, has been applied to the surface of the substrate, the surface undergoes a presputtering treatment to provide an atomically clean surface upon which the second coating layer is formed. One technique to provide an atomically clean surface is ion bombardment etching, which removes surface oxides and adsorbed gases. The substrate having the first coating layer thereon can also be vacuum baked by electron bombardment after ion bombardment. For example, in one type of pre-sputtering treatment that has been utilized, the substrates having the first coating layer thereon were ion bombardment etched at 100 ev and thereafter vacuum baked in the sputter chamber to about 700° C. by electron bombardment just prior to sputtering.

After an atomically clean first coating layer surface has been provided, the second coating layer can be applied. As previously described, the second coating layer is a phase stabilized zirconium oxide material having a columnar microstructure.

Suitable materials that can be utilized to phase stabilize zirconium oxide include, for example, calcium oxide (calcia), hafnium oxide (hafnia), magnesium oxide (magnesia), cerium oxide (ceria), yttrium oxide (yttria) and mixtures thereof. The phase stabilizer should be present in an amount sufficient to phase stabilize the zirconium oxide present in the second coating layer. Generally, between about 5% and 25% of yttrium oxide present in the second coating layer on a molecular basis of the second coating layer is sufficient to phase stabilize the zirconium oxide. Other compositions of stabilized zirconium oxide are shown for example in "Oxide Ceramics" by Ryshkewitch, *Academic Press*, 1960, particularly on pages 354, 364 and 376 thereof, which reference is incorporated by reference herein. Other materials and compositions for providing phase stabilization for zirconium oxide may be known to those skilled in the art.

The sputtering targets utilized in applying the second coating layer of stabilized zirconium oxide can be prepared by plasma spraying stabilized zirconium oxide on a support structure, for example, or by any other method known to those skilled in the art.

In accordance with the present invention, the second coating layer is a sputter deposited stabilized zirconium oxide having a columnar microstructure. The term "columnar microstructure" means that the microstructure of the phase stabilized zirconium oxide coating layer consists of separate growth columns that are in a substantial normal orientation to, and extend upwardly from, the surface of the first coating layer.

Suitable sputtering techniques to form the second layer coating are disclosed in "Thin Solid Films" 63 (1979) 121–129 and "Thin Solid Films" 64 (1979) 337–343 and these publications are herein incorporated by reference.

As is well known to those skilled in the art, sputtering is a process in which material is removed from a source or target (the cathode), by ion bombardment and deposited on the substrate. Generally, rf sputtering is preferred for sputtering insulating materials (e.g. zirconium oxide) and the physics of this process are well known to those skilled in the art.

Generally, in order to obtain a columnar microstructure, geometrical shadowing of the adatom flux must be induced and surface diffusion distances (mobility) of the adatoms must be less than the dimensions of the shadowing features in the plane of the substrate surface. The geometrical shadowing may conveniently be accomplished by providing an adatom flux with two characteristics. First, during sputtering, the adatom flux should arrive at the substrate in a fairly columnated fashion. Second, the angle of adatom incidence on the substrate should change with respect to time. The term "fairly columnated fashion" means that the adatom flux comprises adatoms that travel substantially parallel to one another. For example, an adatom flux originating from a point source and arriving at a small area of substrate would certainly meet this criterion. Generally, an adatom flux from a relatively small flat plate will provide the desired columnated flux. The arrival angle of the adatom flux can be varied with respect to time by rotating the substrate over a flat plate target, for example. Other methods known to those skilled in the art may also be utilized to vary the arrival angle.

Generally, it is desirable for the thickness of the second layer coating to be between about 50 and 130 micrometers although it is anticipated that other coating thicknesses can be utilized depending on the particular application.

As previously stated, the second layer is a phase stabilized zirconium oxide. The stoichiometry of the zirconium oxide in the second coating layer can vary over a ratio of zirconium to oxygen on an atomic basis of between about 1:1 and 1:2. It is anticipated that different types of sputtering techniques may be employed to provide variations in the stoichiometry, including, for example, varying the substrate temperature, deposition rate and sputter atmosphere. For example, a small amount of oxygen could be introduced into the sputtering chamber to change the oxygen content of the sputtered coating.

The present invention can be more completely understood by reference to the following example.

EXAMPLE

Carbon-carbon substrates were coated with the composite coating in accordance with the present invention and thereafter tested for oxidation resistance at elevated temperature.

The first coating layer was formed utilizing a mixture of silicon, silicon carbide and alumina.

The substrate was pretreated by heat treatment for 1 hour at about 2500° F. in an argon atmosphere. The first coating layer was formed by utilizing a mixture of 30% silicon carbide, 50% silicon and 20% alumina (by weight). The silicon carbide utilized was obtained by the Carborundum Company under the trade designation "RA 1200-Green Grit", the alumina was obtained from the Aluminum Company of American under the trade designation "T-61" and particulate silicon was utilized having a particle size of about 325 Tyler Standard Screen scale.

The substrate was packed in a graphite retort to the preferred surface compaction. Thereafter, the composition was dried under vacuum and placed in an inert atmosphere in the heating furnace. The retort and its contents were heated to about 2800° F. and thereafter heated at 2950° F. for two hours, then further heated at 3000° F. for two hours and finally heated at 3050° F. for two hours. The substrate was then removed from the retort and cleaned. The substrate having the first coating layer thereon was then heated at about 3800° F. in an argon atmosphere for about 1 hour.

The second coating layer was applied to the surface of the first coating layer by sputter depositing zirconium oxide stabilized with yttrium oxide. Prior to sputtering, the substrates having the first coating layer were mildly ion etched at 100 ev and then vacuum baked in the sputter chamber to about 700° C. by electron bombardment.

The sputtering atmosphere was krypton gas at a pressure of $4.0 \times 10^{-2}$ Torr. Target power of 1 KW rf at 13.56 MHz was applied to the target material, zirconia stabilized with 20% yttria on a molecular basis, producing a deposition rate on the substrates of about 21.2 nanometers/min. The sputtering run lasted for 75 hours. The substrates were rf grounded and dc floating, except for approximately the last 6 hours of the run the substrates were rf biased at $-35$ volts. The substrates exhibited the following weight gains and thicknesses for the second layer coatings:

| Sample Number | Weight Gain (grams) | Second Layer Coating Thickness (micrometers) |
|---|---|---|
| 1 | .265 | 55.9 |
| 2 | .338 | 81.3 |
| 3 | .288 | 78.7 |

The three substrates were then subjected to a hydrocarbon flame producing a surface temperature on the coated substrates of 3500° F.±100. Sample Numbers 1, 2 and 3 were exposed to the 3500° F.±100 surface temperature for 30, 60 and 90 minutes respectively. In each case, the composite protective coating prevented oxidation attack of the carbon-carbon substrate.

While the invention has been described with respect to preferred embodiments, it is understood that the invention is capable of modifications, rearrangements and substitutions and such are intended to be within the scope of the appended claims.

We claim:

1. A composite protective coating for preventing carbonaceous substrates from degrading in oxygen containing environments comprising:
   (a) a first coating layer applied to the surface of the substrate comprising a silicon carbide type coating; and
   (b) a second coating layer applied to the surface of said first coating layer, said second coating layer comprising a sputter deposited, phase stabilized zirconium oxide having a columnar microstructure.

2. The composite protective coating as recited in claim 1 wherein said zirconium oxide is phase stabilized with a compound selected from the group consisting of calcium oxide, hafnium oxide, magnesium oxide, cerium oxide, yttrium oxide and mixtures thereof.

3. The composite protective coating as recited in claim 1 wherein the atomic ratio of zirconium to oxygen of the zirconium oxide is between about 1:1 and 1:2.

4. The composite protective coating as recited in claim 2 wherein yttrium oxide is utilized as the phase stabilizer and is present in an amount of between 5% and 25% on a molecular basis in said second coating layer.

5. The composite protective coating as recited in claim 1 wherein said first coating layer is a silicon-silicon carbide-alumina coating.

6. The composite protective coating as recited in claim 1 wherein said first coating layer is a silicon-silicon carbide-boron coating.

7. A composite protective coating for preventing carbonaceous substrates from degrading in oxygen containing environments comprising:
   (a) a first coating layer applied to the surface of the substrate formed from a composition selected from the group of mixtures consisting of (1) silicon, silicon carbide and alumina and (2) silicon, silicon carbide and boron; and
   (b) a second coating layer applied to the surface of said first coating layer, said second coating layer comprising a sputter deposited, phase stabilized zirconium oxide having a columnar microstructure.

8. The composite protective coating as recited in claim 7 wherein said zirconium oxide is phase stabilized with a compound selected from the group consisting of calcium oxide, hafnium oxide, magnesium oxide, cerium oxide, yttrium oxide and mixtures thereof.

9. The composite protective coating as recited in claim 7 wherein the atomic ratio of zirconium to oxygen of the zirconium oxide is between about 1:1 and 1:2.

10. The composite protective coating as recited in claim 8 wherein yttrium oxide is utilized as the phase stabilizer and is present in an amount of between 5% and 25% on a molecular basis in said second coating layer.

11. The composite protective coating as recited in claim 7 wherein said first coating layer is a silicon-silicon carbide-alumina coating.

12. The composite protective coating as recited in claim 7 wherein said first coating layer is a silicon-silicon carbide-boron coating.

* * * * *